June 1, 1965  V. L. ARCHER  3,186,358
FLOUR DROPPER FOR COOKIE MAKING MACHINE
Filed April 18, 1962  2 Sheets-Sheet 1
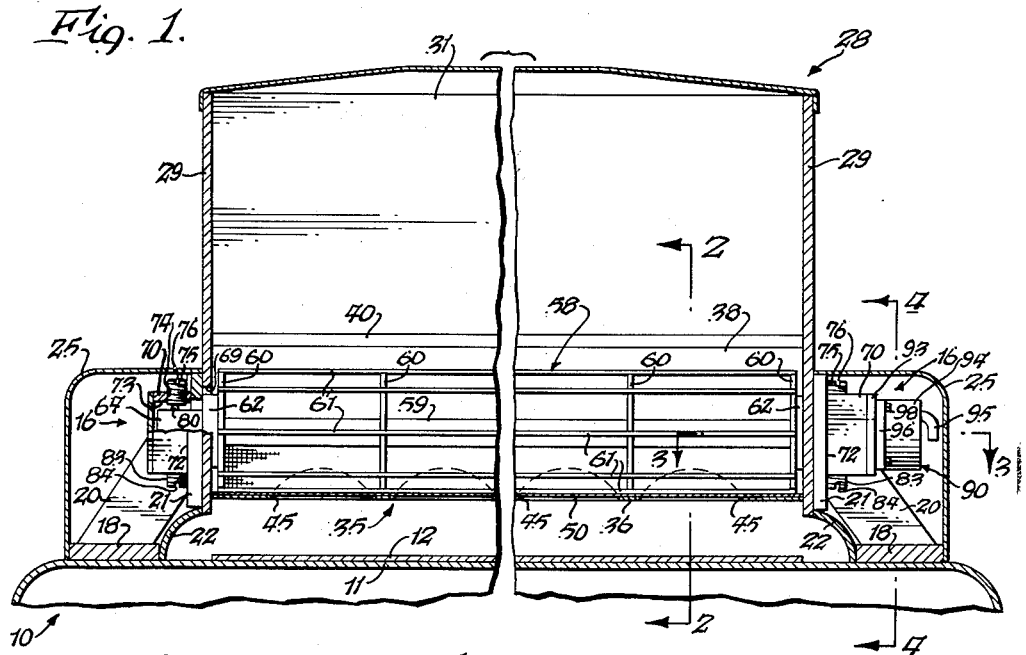
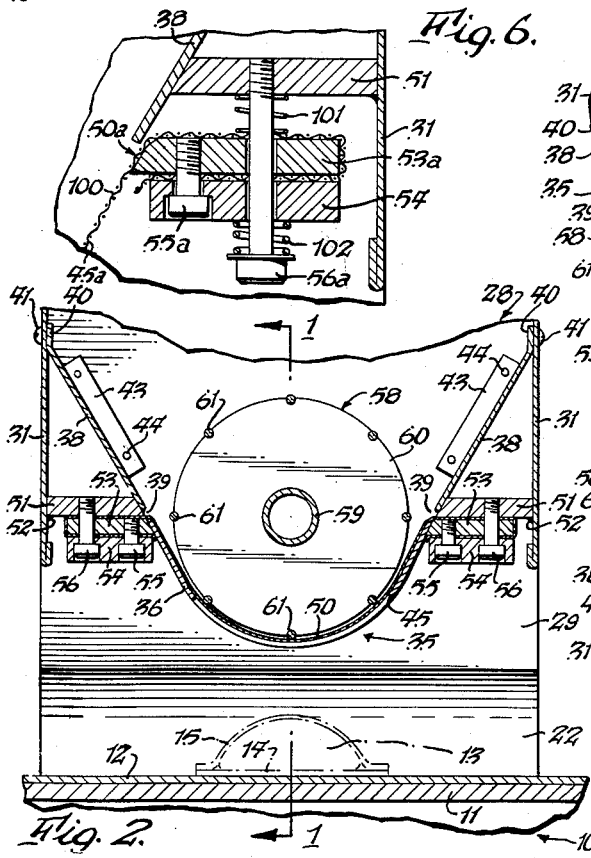
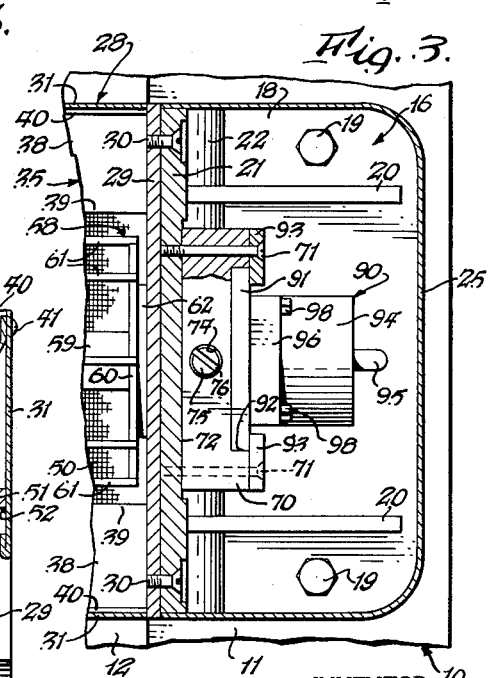
INVENTOR.
Virgil L. Archer
BY
Popp and Sommer
ATTORNEYS June 1, 1965  V. L. ARCHER  3,186,358
FLOUR DROPPER FOR COOKIE MAKING MACHINE
Filed April 18, 1962  2 Sheets-Sheet 2

INVENTOR.
Virgil L. Archer
BY
Popp and Sommer
ATTORNEYS

United States Patent Office 3,186,358
Patented June 1, 1965

3,186,358
FLOUR DROPPER FOR COOKIE MAKING
MACHINE
Virgil L. Archer, Cheektowaga, N.Y., assignor to Haut's
Development Co., Inc., Olean, N.Y., a corporation of
New York
Filed Apr. 18, 1962, Ser. No. 188,418
5 Claims. (Cl. 107—7)

This invention relates to a device for simultaneously dropping a plurality of layers or pads of sifted flour upon the cookie stations of a moving conveyor, such as a belt, on which stations a plurality of lumps or drops of cookie dough are deposited and subsequently formed into the desired shape before being admitted to an oven. The layers or pads of flour can be deposited upon the belt both before and after the lumps of dough are deposited, the flour in the first instance providing a layer of flour which permits the formed cookie to be readily removed from the belt and the layer of flour in the second instance permitting the top face of the cookie to be formed into any desired shape or pattern by downward pressure without sticking to the cookie former.

The present application is particularly related to the copending application of Virgil L. Archer for Cookie Dough Dropper for Cookie Making Machine, Serial No. 188,384, filed April 18, 1962, and also to the copending application of Virgil L. Archer and Robert Challendar for Flattening and Dusting Device for Cookie Making Machine, Serial No. 221,768, filed September 6, 1962.

An important object is to provide such a flour dropper which deposits the minimum required amount of flour at each cookie station, it being highly undesirable to have an excess amount of flour either on the bottom of the finished cookie or upon the top thereof.

Another important object of the present invention is to provide such a flour dropper which will deposit a layer or pad of uniform thickness at each cookie station without danger of bare spots as would permit the cookie dough to stick either to the belt carrying the lump or drop of cookie dough or to the cookie former brought down upon the top face of this lump or drop.

Another important object of the present invention is to provide such a flour dropper which will work uniformly time after time and hence is adapted to the large scale production of cookies.

Another object is to provide such a flour dropper which deposits the layers of flour at the cookie stations rapidly so that the timing or capacity of the cookie making machine is not dependent upon the action of the flour dropper.

Another object is to provide such a flour dropper which is simple in construction and efficient in operation and which will operate without care or breakdown for long periods of time.

Another object is to provide such a flour dropper which can be readily maintained with an adequate quantity of flour.

Another object is to provide such a flour dropper in which any malfunctioning can be quickly detected and corrected.

Another object is to provide such a flour dropper which is simple in construction and low in cost.

Other objects and advantages of the invention will be apparent from the following description and drawings in which:

FIG. 1 is a vertical section taken generally on line 1—1, FIG. 2 through a flour dropper embodying the present invention and showing the same arranged to drop a plurality of layers or pads of sifted flour upon successive rows of cookie stations on the moving belt of a cookie making machine;

FIG. 2 is an enlarged fragmentary vertical sectional view taken on line 2—2, FIG. 1;

FIG. 3 is a fragmentary enlarged horizontal section taken generally on line 3—3, FIG. 1;

FIG. 6 is a fragmentary sectional view similar to FIG. 2 and showing a modified form of the invention.

Figure 4:
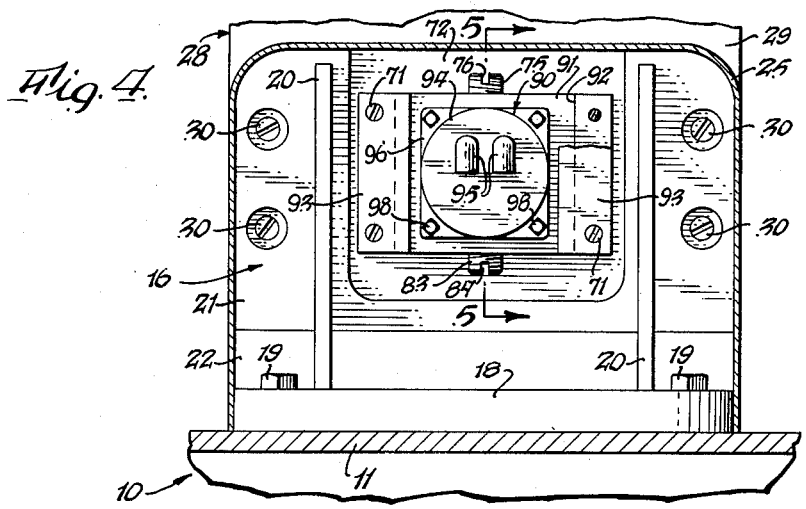
FIG. 4 is an enlarged vertical section taken generally on line 4—4, FIG. 1.

The sifted flour dropper forming the subject of the present invention is designed for use in conjunction with a cookie making machine having a base portion 10 providing a horizontal tabletop 11 carrying a belt 12 on which drops or lumps 13 of soft cookie dough are dropped and formed as described in detail in the said copending patent applications. Two sifted flour droppers embodying the present invention are used in conjunction with the cookie making machine, the first dropping transverse rows of pads or layers 14 of flour severally on the cookie stations on the belt 12 and upon which stations the lumps or drops of soft cookie dough 13 are subsequently deposited and the second sifted flour dropper dropping pads 15 of flour severally at the same cookie stations but this time on top of the lumps or drops of soft cookie dough to permit of forming these lumps or drops to the desired shape.

The sifted flour dropper embodying the present invention is shown as supported by a pair of end heads indicated generally at 16 mounted on the tabletop 11 on opposite sides of the belt 12 so that the flour dropper bridges this belt to drop transverse rows of layers or pads of flour thereon. Each end head 16 is shown as comprising a base plate 18 secured to the tabletop 11 by bolts 19 and each having a pair of vertical plates or ribs 20 projecting diagonally upwardly therefrom and supporting a vertical plate 21, the plates 21 at the opposite sides of the belt 12 being in parallel opposed relation to each other. Each end head 16 is completed by a quarter-round strip of sheet metal 22, the lower edge of which is welded to the edge of the base plate 18 facing the belt 12 and the upper edge of which is welded to the underside of the vertical plate 21 of the end head.

Each of these end heads 16 can be enclosed by a readily removable sheet metal housing or casting 25, the lower rim of which is shown as fitting around the ends and outer side of the base plate 18 and the upper rim of which is shown as fitting around the vertical ends and top edge of the vertical plate 21.

These vertical plates 21 of the end head 16 support a flour box or hopper indicated generally at 28. This flour box is shown as having generally rectangular vertical end walls 29 secured to the inside or opposing faces of the vertical plates 21 of the end heads 16 by screws 30 or in any other suitable manner. Rectangular vertical side walls 31 connect the vertical edges of these end walls 29 to form a box which is open at its top and at its bottom.

The floor 35 of the box is in the form of three separate sections, namely, a cylindroidal central bottom section 36 flanked by upper inclined side sections 38 the lower edges of which are in spaced relation to the upper edges of the cylindroidal central bottom section as indicated at 39. Each upper inclined side section 38 can be secured to the box walls in any suitable manner as by a longitudinal flange 40 along its upper edge which is shown as secured by screws 41 to the corresponding side wall 31 of the box, and end flanges 43 shown as secured by screws 44 to the end walls 29 of the box. The cylindroidal bottom section 36 of the bottom wall is provided with a series of openings 45 spaced along its bottom which openings are of the approximate shape of the cookie to be produced. It is assumed that round cookies will be produced and hence these openings 45 are round in form.

The round layers or pads of flour discharged through and shaped by these openings 45 are sifted through a screen cloth which also forms part of the floor or bottom of the box, this screen cloth and its associated parts being preferably constructed as follows:

The numeral 50 represents a rectangular piece of screening cloth which can be of any desired composition and mesh to support a body of flour within the box 28 and through which a pad or layer of flour is discharged by the cross bars of a reel in the flour box which is oscillated for this purpose. Desirably the piece of screening cloth can be a plastic sheet with holes formed therein, although it is also possible to use bolting silks or other screen cloths for this purpose. It will be seen that the cylindroidal sheet metal bottom section 36 with its holes 45 provides a means blanking off areas of the screen cloth 50 other than a row of openings along and below the axis of the screen cloth 50 and corresponding to the cookie stations of the conveyor.

This flexible piece of screen cloth 50 lies along the inside of the trough-shaped or cylindroidal bottom section 36 of the flour box to bridge the several openings 45 therein and thereby form the bottom of the box so far as these openings are concerned.

This screen may be blanked out with a suitable masking agent, leaving a hole pattern open for flour to drop through, thereby eliminating the need for cylindroidal bottom 36 to touch the screen to form the flour pattern. With the weight of the flour carried by the screen, it is brought into contact with the concave upper face of this cylindroidal bottom section 36 and the opposite edges of this screen cloth project outwardly through the openings or slots 39 between the cylindroidal section 36 and the inclined upper side parts 38 of the flour box bottom. These projecting edges are each clamped against the underside of a stationary bar 51 which extends lengthwise of the box and is secured, as by welding as indicated at 52, to the corresponding side wall 31 thereof with its bottom face generally in line with the slots or spaces 39. The screen cloth is clamped to the underface of each of these bars by a bar 53 welded to and projecting horizontally outwardly from each longitudinal side rim of the cylindroidal bottom section 36. Desirably the ends of the screen cloth 50 fold under these bars 53 and are clamped thereto by bottom clamping bars 54, each of these bottom clamping bars being secured to the bar 53 by means of a series of short screws 55 and to the bars 51 by means of a series of long screws 56.

The reel, indicated generally at 58, which serves to drop the required quantity of flour as a layer or pad through the screened openings 45 is preferably constructed as follows:

The numeral 59 represents a tubular shaft for the reel which is arranged concentrically within the cylindroidal screen 50 and sheet metal bottom section 36 and which has a series of spaced circular disks 60 welded thereon, these disks comprising a pair of end disks and a series of intermediate disks and all being of the same diameter, this being slightly smaller than the inside diameter of the cylindroidal section 36 of the bottom of the flour box or hopper. On the peripheries of these disks are welded a series of peripheral projections or round bars 61 each of which extends from one end disk to the opposite end disk and these bars being spaced at regular intervals and projecting from the peripheries of the disks, these bars being shown as being eight in number. A tubular hub 62 is secured, as by screws 63 to each end of the shaft 59 and the corresponding end disk 60 thereof and each hub is journalled in a sleeve bearing or spacer ring 64. Each hub 62 is provided with an oversize axial through bore 65 having a keyway for a key 66 for a purpose which will presently appear. Each hub projects through an oversize opening 68 in each end wall 29 of the flour box or hopper 28 and each hub also project through an oversize opening 69 in the vertical plate 21 of each end head 16. The inner end of each bearing sleeve or spacing ring 64 is arranged in the oversize opening 69 of its end head 16 so as to be capable of vertical movement therein.

Figure 5:
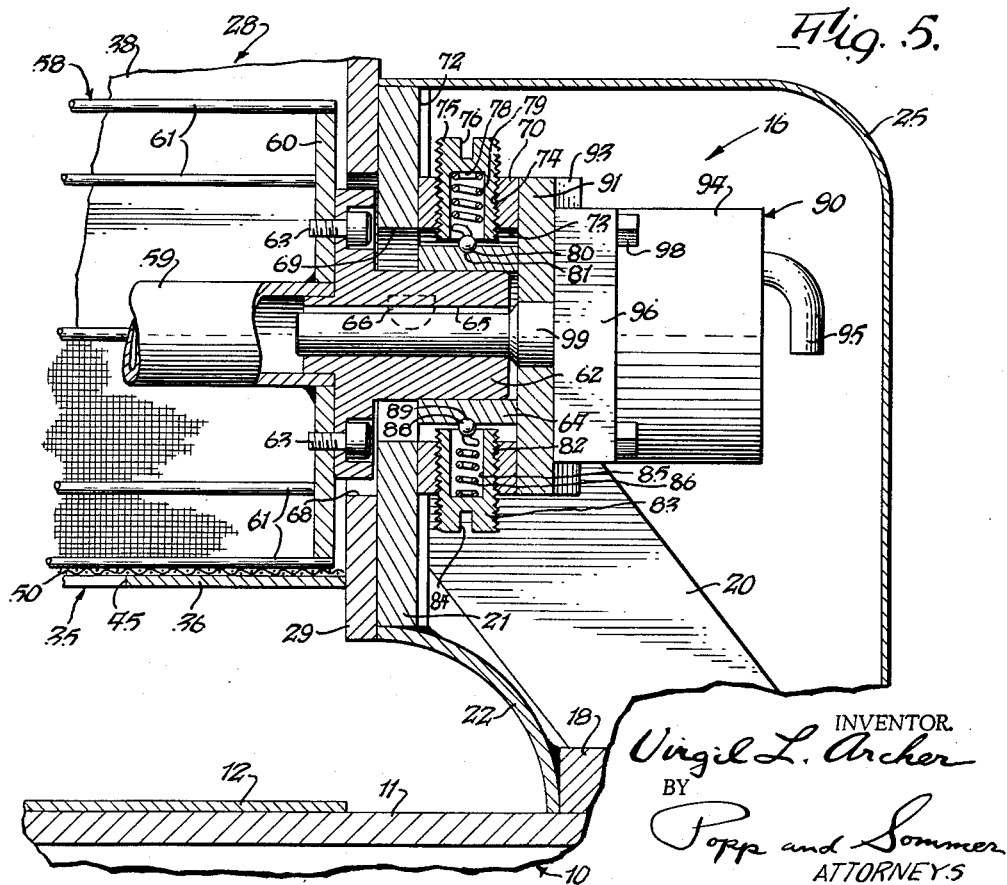
FIG. 5 is a still further enlarged vertical section taken generally on line 5—5, FIG. 4.

A feature of the invention resides in a yielding spring loaded rubbing contact between the projections or bars 61 and the screen cloth 50 and which in FIGS. 1–5 is shown as accomplished by biasing the reel 58 downwardly. To this end a rectangular supporting block 70 is secured, as by screws 71 to the outer recessed face 72 of the vertical plate 21 of each end head 16. Each of these blocks has an oversize bore 73 at its center which permits vertical movement of the bearing sleeve or spacer ring 64 contained therein together with the hub 62 journalled in the bearing sleeve. A top threaded bore 74 extends into this oversize bore 73 from the top of this block 70 and in this threaded bore is screwed a screw cup 75 having a screw driver slot 76 at its upper end and a cylindrical deep socket 78 in its lower end. In this socket is housed a relatively heavy helical compression spring 79 which bears downwardly on a ball 80 contained within an indent 81 in the top of the bearing sleeve or spacer ring 64. A bottom threaded bore 82 extends into the oversize bore 73 from the bottom of the block 70 and in this threaded bore is screwed a screw cup 83 having a screw driver slot 84 at its lower end and a cylindrical deep socket 85 at its upper end. In this socket is housed a relatively light helical compression spring 86 which bears upwardly on a ball 88 contained within an indent 89 in the bottom of the bearing sleeve or spacer ring 64. It will be seen that the bearing sleeves 64, and hence each end of the shaft 59 of the reel 58, is supported between the vertical helical compression springs 79 and 86 so that the reel 58 is capable of vertical movement. Since the top springs 79 are heavier, the net effect of these springs is to hold the bars 61 of the reel yieldingly in downward engagement with the screen cloth 50, this being an important feature of the present invention.

The reel 58 is oscillated each time a row of cookie stations is brought under the row of openings 45 in the cylindroidal bottom section 36 of the flour box or hopper 28, the belt 12 so bringing these cookie stations into position being halted during such oscillation of the reel. To this end a hydraulic motor or oscillatory part twin rotary actuator 90 is secured to one of the blocks 70 and is operatively connected with the adjacent hub 62. An end plate 91 is secured within a central recess 92 in the outer face of one of the blocks 70 by side clamping plates or way bars 93 which are also secured in position by the screws 71 and which clamping plates or way bars permit vertical adjustment of these end plates 91. The housing 94 for the reciprocating torque actuator is shown as being cylindrical and as supplied with liquid via two lines 95 and as having a square attachment base 96 forming four attachment ears secured by screws 98 to the face of the plate 91. The reciprocating torque actuator 90 includes an output shaft 99 projecting into and keyed to the oversize bore 65 in the adjacent hub 62 of the reel 58. This oversize bore permits vertical or transverse movement of the associated sleeve bearing 64 relative to this output shaft 99. This oscillatory part turn rotary actuator 90 is of conventional construction available on the open market and preferably is of the type described in detail in the Charlson Patent 2,821,171, dated January 28, 1958, now Reissue No. 25,291 dated December 4, 1962.

In the operation of the form of the invention shown in FIGS. 1–5, it is assumed that the belt 12 is being advanced step by step under the flour dropper of the present invention so as to bring a succession of transverse rows of cookie stations under the transverse row of bottom openings 45 of the flour box or hopper 28. Each such cookie station may have a lump or drop 13 of soft cookie dough thereon in which event the flour dropper of the present invention deposits a layer or pad 15 of flour on top of the lump or drops so that it can be subsequently flattened or otherwise formed. If each such cookie station does not have a lump or drop 13 of soft cookie dough thereon, the flour dropper of the present invention deposits a layer or pad 14 of such flour from each screened hole 45 on the belt 12 at each station preparatory to having the lump or drop 13 of cookie dough deposited thereon.

When the belt 12 so comes to a stop with a transverse row of cookie stations thereon under the transverse row of screened openings 45 in the cylindroidal bottom section 36 of the flour box 28, the reciprocating torque actuator 90 is energized, by the introduction of oil through its line 95, to oscillate its output shaft 99. The degree of such oscillation, as well as its speed, can be regulated by the amount and rate of movement of oil in the control line 95 and it will be assumed that the degree of such oscillation is such as to sweep the three bars 61 of the reel 58 across the screened openings 45.

This movement is transmitted from the reciprocating torque actuator 90 via its output shaft 99 and the key 66 to one of the hubs 62 of the reel 58. This movement is transmitted from this hub via the screws 63 to the adjacent end disk 60 of the reel and thence to the shaft 59 to which this and the other disks 60 are welded. This oscillates the bars 61 of the reel generally parallel with the axis of the bearing sleeves or spacer rings 64 which are biased downwardly by the top helical compression springs 79 so as to yieldingly hold the bottom bars 61 of the reel 58 against the screen cloth 50. This limited movement of the bearing sleeves or spacer rings 64 relative to the output shaft 99 is permitted by the oversize bore 65 and by the oversize bores 69 and 73, the oversize bore 65 permitting limited movement of the hub 62 relative to the fixed axis of the shaft 99 and the oversize bores 69 and 73 serving to permit such vertical movement of the hub 62 relative to the fixed structure 21, 70, 91 and 93 carrying the part turn rotary actuator 90. The spring loaded bearing sleeve 64 serves to bias the hub 62 of the reel downwardly in the oversize bore 73. Accordingly, these bars travel over this cloth with a spring loaded rubbing action which hase been found to be fully effective in moving layers of flour of uniform thickness through the screened openings 45 into the cookie stations of the belt 12.

It will be apparent that instead of having the reel 58 biased downwardly by the two helical compression springs 79 at its hubs in order to provide the required spring loaded rubbing action of the bars 61 of the reel against the screen cloth 50, it would be possible to hold the screen cloth yieldingly upwardly against these bars for the same purpose. Such a modification of the invention is illustrated in FIG. 6 in which it will be noted that the sheet metal cylindroidal bottom section 36 of the flour box or hopper 28 is eliminated and instead the screen cloth 50a used in substitution therefor has a filled in, blinded or blanked off area 100 leaving circular free or open screened areas 45a which correspond to the row of circular openings 45 provided in the sheet metal cylindroidal bottom section 36 in the form of the invention shown in FIGS. 1–5.

The mounting for the opposite longitudinal edges of this screen cloth 50a is substantially the same as with the form of the invention shown in FIGS. 1–5, except that springs are provided to bias the screen cloth 50a upwardly against the longitudinal bars 61 of the reel 58. To this end, as with the form of the invention shown in FIGS. 1–5, bars 51 are welded to the side walls 31 of the flour box with their lower faces generally coplanar with the bottom edges of the inclined side walls 38 of the hopper bottom. The longitudinal edges of the screen cloth are each wound around the upper face, outer edge and bottom of a bar 53a which corresponds to the bar 53 in FIGS. 1–5 and is clamped thereto by screws 55a. However, each bar 53a is spaced from its companion fixed bar 51 and a relatively light helical compression spring 101 surrounds each screw 56a and is interposed between the top of the screen cloth 50a and the bottom of the fixed bar 51. The upward biasing of the screen cloth is affected by a helical compression spring 102 surrounding the shank of the screw 56a and interposed between the head at its bottom end and the clamping bar 54. It will be seen that with this arrangement and with proper tightening of the screws 56a, the desired tension can be obtained through the differential forces of the springs 101 and 102 to hold the screen cloth upwardly against the longitudinal bars 61 of the reel 58 to provide the required spring loaded rubbing action between these parts. Further the flour will sift only through the open or free area 45a of the screen which again are shown as being round to produce round cookies.

From the foregoing, it will be seen that the flour sifter of the present invention is particularly adapted for use in conjunction with a cookie making machine designed for line production of rows of cookies and that it accomplishes the various objects previously set forth, particularly in depositing pads of flour of uniform thickness on the rows of cookie stations on a moving belt either to support a lump or drop of cookie dough deposited thereon or to cover such a lump or drop of cookie dough for preparing it for being formed by downward pressure from a cookie former.

I claim:

1. In a cookie making machine having a step-by-step conveyer with a progression of transverse rows of cookie stations thereon; the combination therewith of a flour dropper adapted to drop separate pads of flour simultaneously on the cookie stations of each row, comprising a horizontally elongated flour box arranged transversely above said conveyor in spaced relation thereto, the bottom of said flour box being formed by a cylindroidal screen cloth, means blanking off areas of said cylindroidal screen cloth other than a row of open areas along and below the axis of the cylindroidal screen cloth and corresponding to said transverse rows of cookie stations on said conveyor, a reel shaft arranged coaxially of said cylindroidal screen with its ends adjacent the corresponding end walls of said flour box, a reel on said shaft having peripheral projections adapted to contact the concave face of said cylindroidal screen cloth, bearing means supporting each end of said shaft, means oscillating said shaft to oscillate said reel, and spring means biasing each of said bearing means downwardly to provide a spring loaded rubbing contact between said peripheral projections and cylindroidal screen cloth during oscillation of said reel shaft.

2. The combination with a cookie making machine having a step-by-step conveyer with a progression of transverse rows of cookie station thereon; the combination therewith of a flour dropper adapted to drop separate pads of flour simultaneously on the cookie stations of each row, comprising a horizontally elongated flour box arranged transversely above said conveyor in spaced relation thereto, the bottom of said flour box being formed by a cylindroidal screen cloth, means blanking off areas of said cylindroidal screen cloth other than a row of open areas along and below the axis of the cylindroidal screen cloth and corresponding to said transverse rows of cookie stations on said conveyor, a reel shaft arranged coaxially of said cylindroidal screen with its ends adjacent the corresponding end walls of said flour box, a reel on said shaft having peripheral projections adapted to contact the concave face of said cylindroidal screen cloth, bearing means supporting each end of said shaft, means oscillating said shaft to oscillate said reel, a block fixed to each end wall of said flour box and having an oversize opening containing the corresponding bearing means for said shaft, and spring means biasing each of said bearing means downwardly to provide a spring loaded rubbing contact between said peripheral projections and said cylindroidal screen cloth during the oscillation of said reel shaft.

3. The combination set forth in claim 2 wherein said spring means for each of said bearing means comprises a first vertical helical compression spring operatively interposed between the bottom of each block and the bottom of the companion bearing means and a second vertical helical compression spring operatively interposed between the top of each bearing block and the top of the companion bearing means, said second spring being heavier than said first spring to provide a spring loaded rubbing contact between said peripheral projections and said cylindroidal screen cloth during the oscillation of said reel shaft.

4. The combination set forth in claim 2 wherein said spring means for each of said bearing means comprises a first cup-shaped screw plug in a vertical threaded bore through the bottom of said block and opening into said oversize opening thereof, a first vertical helical compression spring operatively interposed between said first plug and the bottom of the companion bearing means, a second cup-shaped screw plug in a vertical threaded bore through the top of said block and opening into said oversize opening thereof, and a second vertical helical compression spring operatively interposed between said second plug and the top of the companion bearing means, said second spring being heavier than said first spring to provide a spring loaded rubbing contact between said peripheral projections and said cylindroidal screen cloth during the oscillation of said reel shaft.

5. The combination set forth in claim 4 wherein the opposing ends of said helical compression springs each bears against a ball, and wherein each ball is set into a recess in said bearing means.

References Cited by the Examiner
UNITED STATES PATENTS

| | | | |
|---|---|---|---|
| 476,430 | 6/92 | Tangenberg | 209—283 |
| 907,351 | 12/08 | Herbert | 118—24 |
| 1,748,543 | 2/30 | Devlin | 107—7.1 |
| 1,926,903 | 9/33 | Kirchhoff | 209—236 |
| 2,213,719 | 9/40 | Repath et al. | 209—283 X |
| 2,735,548 | 2/56 | Hoiness | 209—283 |

ROBERT E. PULFREY, *Primary Examiner.*

CHARLES A. WILLMUTH, WILLIAM B. PENN,
*Examiners.*